United States Patent
Starner et al.

(10) Patent No.: US 9,979,547 B2
(45) Date of Patent: May 22, 2018

(54) PASSWORD MANAGEMENT

(71) Applicant: Google LLC, Mountain View, CA (US)

(72) Inventors: Thad Eugene Starner, Atlanta, GA (US); Michael Patrick Johnson, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 387 days.

(21) Appl. No.: 13/889,872

(22) Filed: May 8, 2013

(65) Prior Publication Data
US 2014/0337634 A1 Nov. 13, 2014

(51) Int. Cl.
H04L 9/32 (2006.01)
G06F 21/32 (2013.01)
G06F 3/01 (2006.01)
H04L 29/06 (2006.01)
H04W 12/06 (2009.01)

(52) U.S. Cl.
CPC ............ *H04L 9/3231* (2013.01); *G06F 3/013* (2013.01); *G06F 21/32* (2013.01); *H04L 63/0861* (2013.01); *H04W 12/06* (2013.01); *H04L 63/0853* (2013.01)

(58) Field of Classification Search
CPC ... H04L 9/3231; H04L 63/0861; G06F 3/013; G06F 21/32; G06F 21/00; H04W 12/06
See application file for complete search history.

(56) References Cited

U.S. PATENT DOCUMENTS 6,431,705 B1 * 8/2002 Linden ............... G02C 11/00
351/158
8,368,794 B2 2/2013 Sako
8,430,310 B1 4/2013 Ho et al.
(Continued)

FOREIGN PATENT DOCUMENTS

WO 2001006298 1/2001
WO 2013019701 A1 2/2013

OTHER PUBLICATIONS

International Search Report and Written Opinion of International Application No. PCT/US2014/017117 dated Jun. 23, 2014 (dated Jul. 1, 2014).

Primary Examiner — Saleh Najjar
Assistant Examiner — Devin E Almeida
(74) Attorney, Agent, or Firm — McDonnell Boehnen Hulbert & Berghoff LLP

(57) ABSTRACT

Methods, apparatus, and computer-readable media are described herein related to biometric authentication. A first computing device can detect a machine-readable code displayed by a second computing device, where the machine-readable code can identify protected information viewable via the second computing device. In response to detecting the machine-readable code, the first computing device can acquire biometric data via one or more biometric sensors associated with the first computing device. Based at least in part on the biometric data, the first computing device can generate an authentication message that includes authentication information and identifies the protected information. The first computing device can then send the authentication message to an authentication server for verification of the authentication information, where verification of the authentication information can allow access to the protected information via the second computing device.

27 Claims, 14 Drawing Sheets

(56) References Cited

U.S. PATENT DOCUMENTS

| | | | |
|---|---|---|---|
| 2006/0115130 A1* | 6/2006 | Kozlay | 382/117 |
| 2007/0052672 A1 | 3/2007 | Ritter | |
| 2007/0131759 A1 | 6/2007 | Cox et al. | |
| 2010/0085150 A1* | 4/2010 | Aikawa et al. | 340/5.82 |
| 2010/0315201 A1* | 12/2010 | Hirata et al. | 340/5.82 |
| 2010/0332841 A1 | 12/2010 | Watts et al. | |
| 2011/0213664 A1 | 9/2011 | Osterhout | |
| 2011/0219427 A1* | 9/2011 | Hito et al. | 726/3 |
| 2011/0295502 A1 | 12/2011 | Faenger | |
| 2013/0069787 A1 | 3/2013 | Petrou | |

* cited by examiner

PASSWORD MANAGEMENT

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, a method is provided. A first computing device detects a machine-readable code that is displayed by a second computing device. The machine-readable code identifies protected information that is viewable via the second computing device. Responsive to detecting the machine-readable code, the first computing device acquires biometric data via one or more biometric sensors associated with the first computing device, generates an authentication message based at least in part on the biometric data, where the authentication message includes authentication information and identifies the protected information, and sends the authentication message to an authentication server for verification of the authentication information, where verification of the authentication information allows access to the protected information via the second computing device.

In another aspect, a first computing device is provided. The first computing device includes at least one processor and a non-transitory computer-readable storage medium having stored thereon program instructions. The program instructions, upon execution by the processor, cause the first computing device to perform functions including: detecting a machine-readable code that is displayed by a second computing device, where the machine-readable code identifies protected information that is viewable via the second computing device; and responsive to detecting the machine-readable code: acquiring biometric data via one or more biometric sensors associated with the first computing device, generating an authentication message based at least in part on the biometric data where the authentication message includes authentication information and identifies the protected information, and sending the authentication message to an authentication server for verification of the authentication information, where verification of the authentication information allows access to the protected information via the second computing device.

In yet another aspect, a computing device is provided. The computing device includes at least one processor and a non-transitory computer-readable storage medium having stored thereon program instructions. The program instructions, upon execution by the processor, cause the computing device to perform functions including: displaying a pre-access interface associated with protected information, where the pre-access interface includes a machine-readable code that identifies the protected information, and receiving an access-verification message that indicates verification of authentication information, where the authentication information is acquired by another computing device based on biometric data acquired in response to detection of the machine-readable code.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
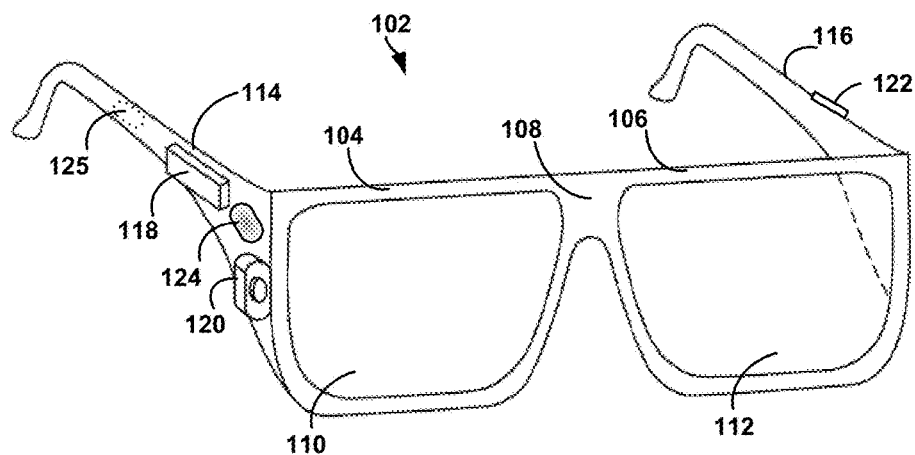
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An example computing device may be configured to detect machine-readable code displayed by a second computing device and responsively acquire biometric data for a user of the computing device. The biometric data may then be used to authenticate the user so that the user can access content associated with the machine-readable code via the second computing device.

For example, when a wearer of a head-mountable device (HMD) wants to access secured information on a second computing device, such as via a password-protected webpage displayed on the wearer's laptop, an example method may be used by the HMD to log on to the webpage on the laptop. In particular, the HMD may detect a quick response (QR) code included on the login webpage that is displayed by the laptop. In response, the HMD may obtain biometric data identifying the wearer. The biometric data may then be sent to a web server that is associated with the QR code. The web server can then use the biometric data to identify the particular wearer and authorize access to secure content on the laptop, e.g., by logging the wearer into the webpage on the laptop.

In an example embodiment, the biometric data may be used to authenticate a user in lieu of a password, e.g., so that a user's HMD can log the user on to a webpage on their laptop. As such, the biometric data can serve as a replacement for passwords entirely. Moreover, users may view such biometric authentication as superior to passwords, since the biometric data may be acquired automatically by the HMD, without requiring the user to take any action or remember a password. In some cases, the acquisition of the biometric data by the HMD, and possibly the entire process of using the biometric data to log the user in to the webpage on their laptop, may be transparent to the user.

Further, an example method, using biometric data for purposes of authentication, may provide as much or more security for protected information than the typical username and password construct. For example, the HMD may have a private key and a public key, and may share its public key with a server configured to authenticate the user. The HMD can encrypt the biometric data (and/or other information needed for authentication) with its private key, send the encrypted data to a server, and the server can decrypt the data using the public key of the HMD. Other cryptographic methods and additional security measures are possible as well.

Alternatively, biometric data might be used in conjunction with typical passwords; simply to help user's remember their passwords. For example, instead of using the biometric data to directly log a user on to a webpage, the biometric data may be used to retrieve a user's password. More specifically, when a server identifies a user by way of their biometric data, the server may send the HMD the user's password for the webpage associated with the QR code on the webpage. The HMD may then display the password to the wearer, so that the wearer does not need to remember the password, and can type the password into the webpage on their laptop. (Note that when worn, an HMD display may be designed such that it can only be seen by the wearer.) Moreover, an example method may be performed automatically and transparently, such that from the wearer's perspective, the user's password simply appears on the display of their HMD whenever they view a login webpage on their laptop.

Various types of biometric data may be utilized to verify a user's identity and authorize access to secure content. For example, a mobile device such as an HMD or mobile phone may be configured to capture an image of a user's eye. The image of the user's eye may be analyzed to detect various parts of the eye, such as the center of the pupil, the edge of the pupil, the edge of the iris, and the user's eyelids and eyelashes. In particular, the patterns in the user's iris may be analyzed and translated into a unique code. Due to numerous unique points in an iris, iris scanning can be implemented with a high level of success for authentication purposes. As images of the eye or data obtained from analysis thereof may be used to uniquely identify a particular user. Other forms of biometric data, such as fingerprint data, hand/finger geometry, vein geometry, and voiceprints, among other possibilities, may be utilized in addition or in the alternative to eye data. Other eye data and methods of eye data acquisition can be utilized, both known in the art and not yet known.

It should be understood that the above examples of the method are provided for illustrative purposes, and should not be construed as limiting.

II. Example Wearable Computing Devices

Systems and devices in which example embodiments may be implemented will now be described in greater detail. In general, an example system may be implemented in or may take the form of a WCD. In an example embodiment, a WCD takes the form of or includes a head-mountable device (HMD).

An example system may also be implemented in or take the form of other devices, such as a mobile phone, tablet computer, laptop computer, and computing appliance, each configured with sensors, cameras, and the like arranged to capture/scan a user's eye, face, or record other biometric data. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands, and such inputs may take the form of a finger swipe along the touchpad, a finger tap on the touchpad, or the like. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
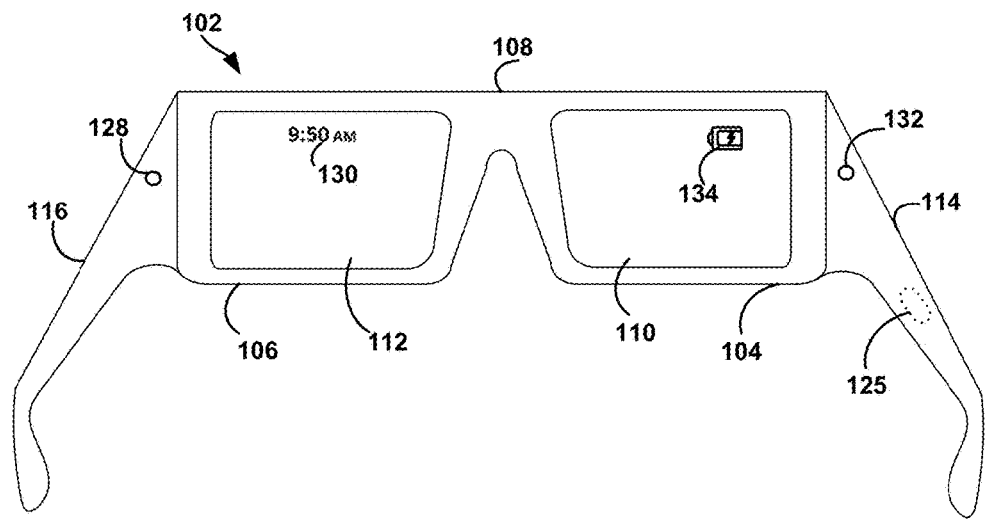
FIG. 1B illustrates an alternate view of the wearable computing system illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
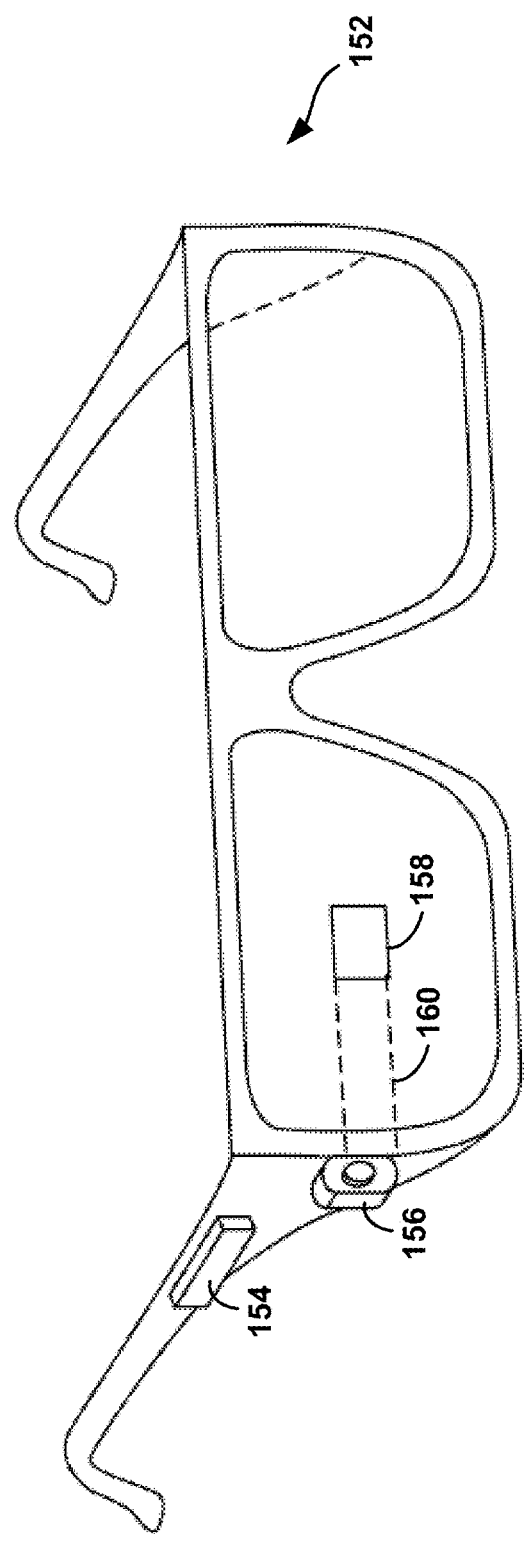
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
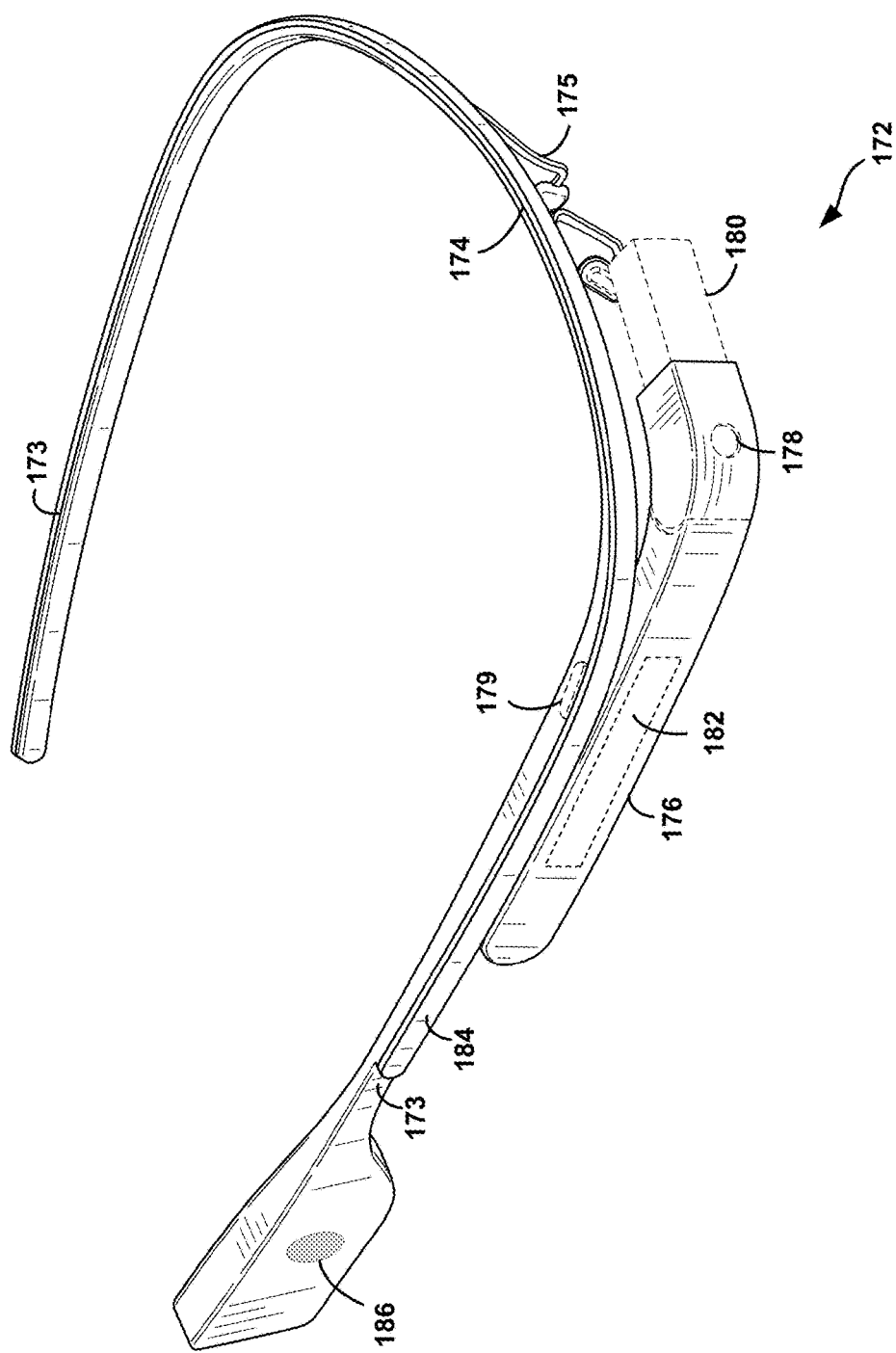
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
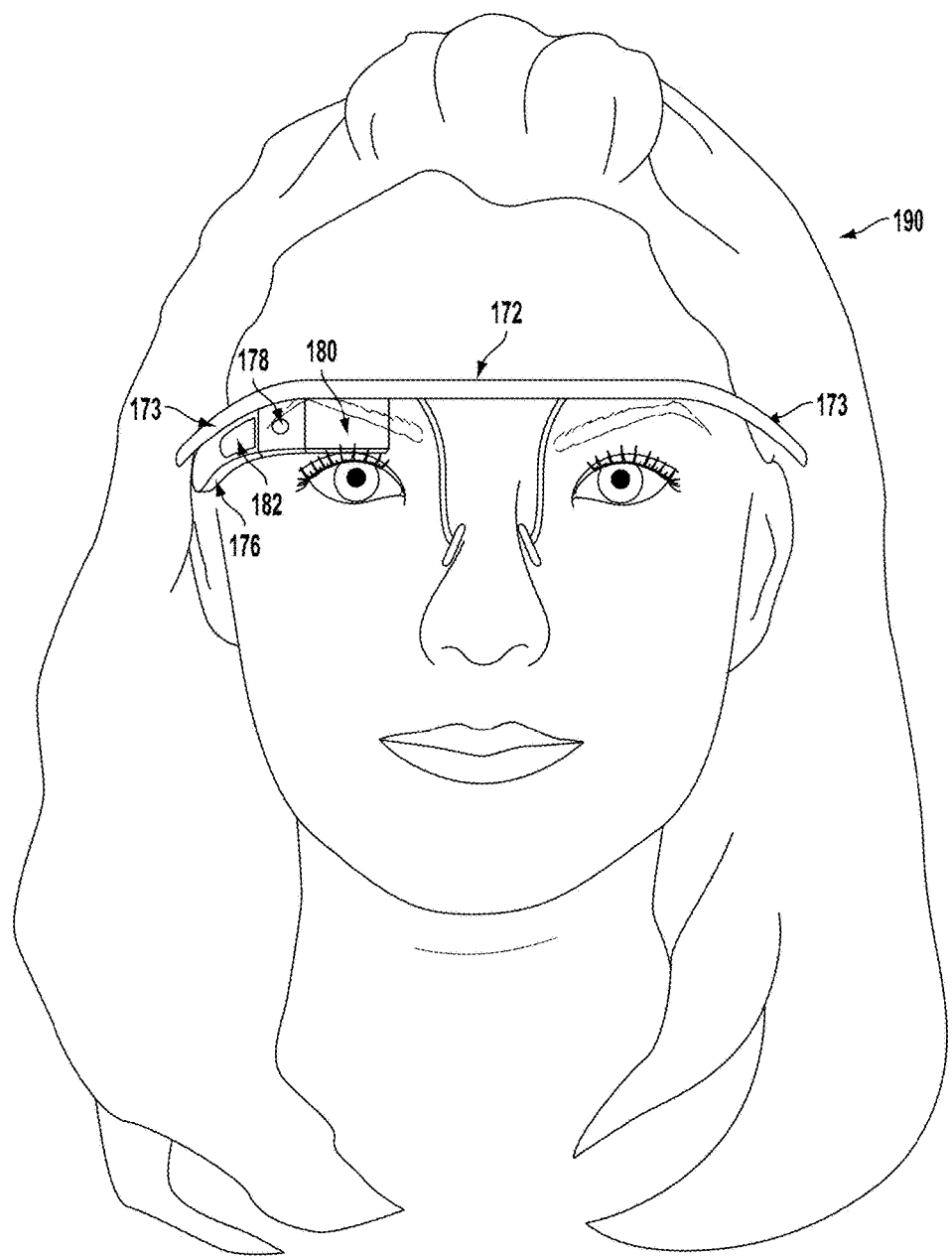
FIGS. 1E-1G are simplified illustrations of the wearable computing system shown in FIG. 1D, being worn by a wearer.
Figure 1F:
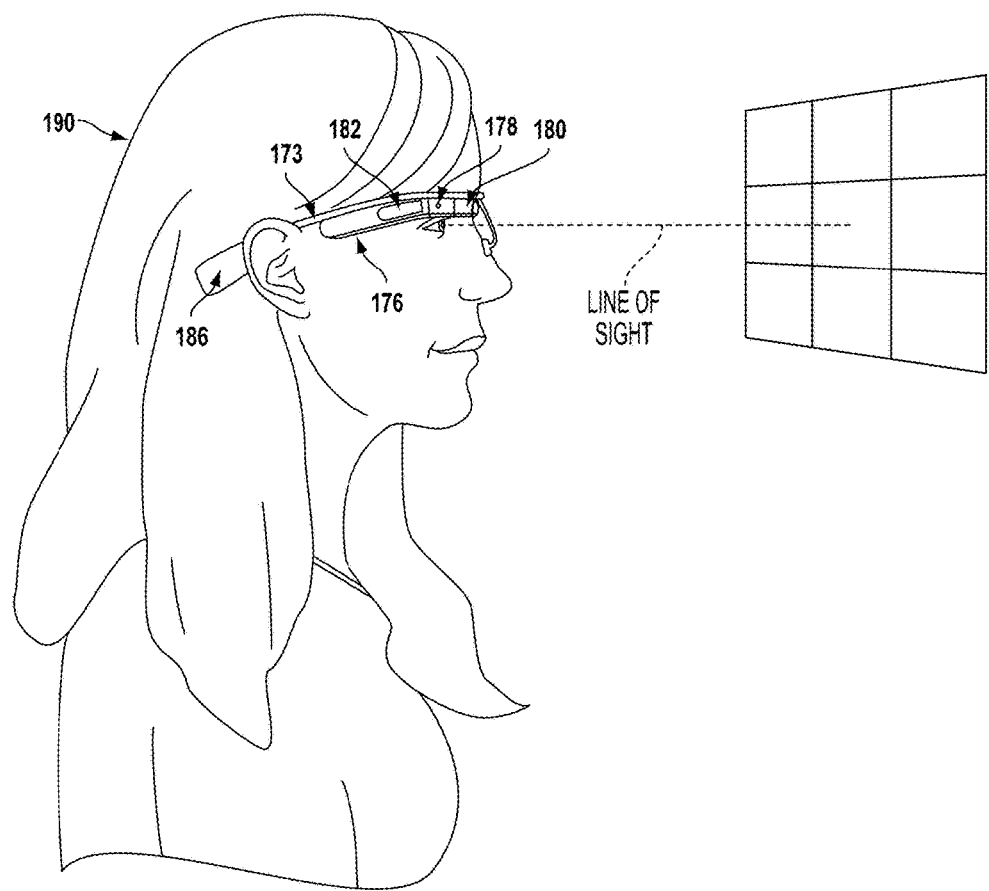
Figure 1G:
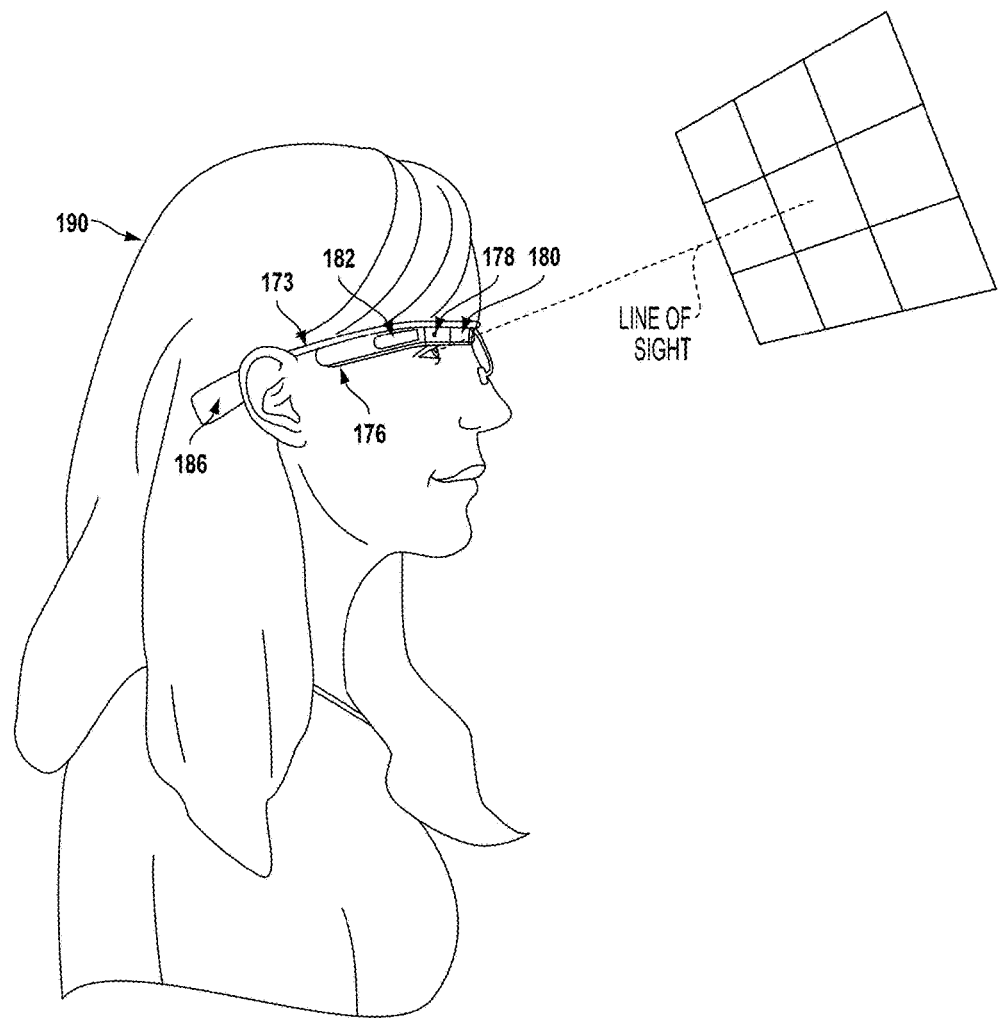

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
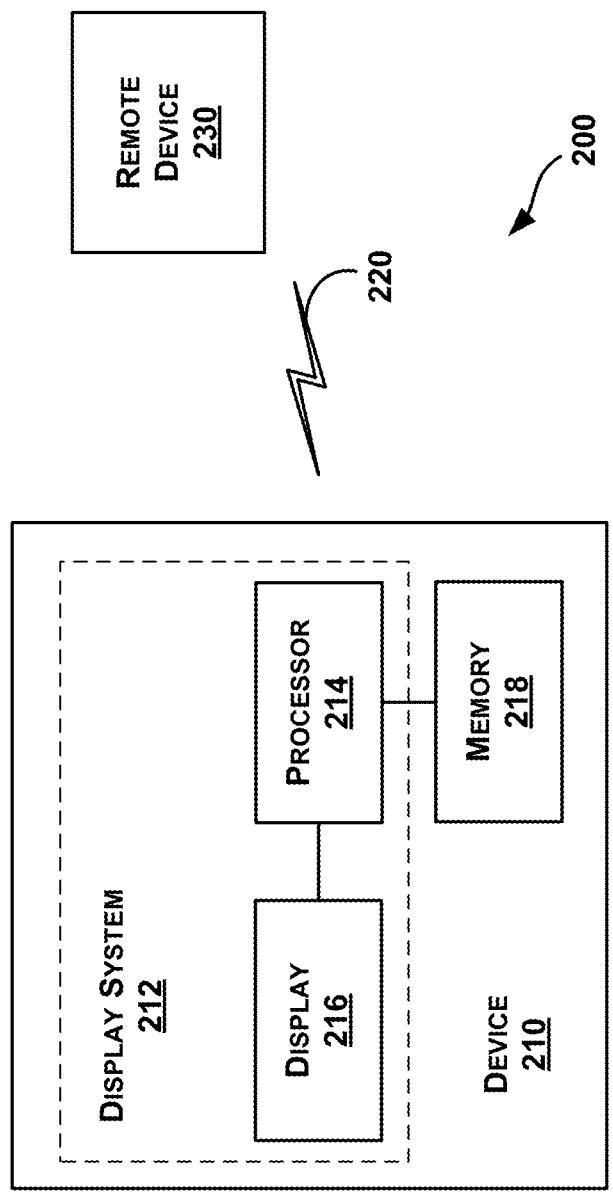
FIG. 2 illustrates a schematic drawing of a computing device according to an example embodiment.

FIG. 2 illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

III. Acquisition Of Biometric Data For Authorization

The HMD can obtain biometric data of a wearer of the HMD utilizing one or more sensors (e.g., infrared proximity sensors, infrared photodiodes, and/or cameras) or other devices coupled to the HMD. In particular, eye-scan data can be obtained by the HMD by various means. For example, in one embodiment, the HMD may prompt a wearer to track an object displayed on the HMD. The object may be first displayed at a first location, then move on the display to a second location, and the wearer tracks the object by focusing their eye on the object as it moves across the display. This movement of the eye exposes may help to expose the entire iris, or at least a substantial portion thereof, to the one or more sensors, allowing for a more detailed scan for authentication purposes. In some embodiments, the object may move back and forth until a successful scan of the eye is completed. Multiple scans may provide a more detailed digital template to the HMD since the sensors will have more time to capture individual images of a user's eye.

In another embodiment, the eye-scan prompt may involve displaying a stationary object on the display of the HMD and displaying an indication to track the stationary object while turning the wearer's head left and right along a transverse plane, and may involve displaying an indication to fixate on a particular location while turning the wearer's head. By instructing the user to fixate on a particular location (either an object displayed on the computing device or a particular location in the distance) while turning the user's head left and right, the user's vestibulo-ocular reflex is exposed. The vestibule-ocular reflex is a reflex eye movement that stabilizes images on the retina during head movement by producing an eye movement in the direction opposite to the head movement, thus preserving the image on the center of the visual field (e.g., when the head moves to the right, the eye moves to the left, and vice versa).

In yet another embodiment, the eye-scan prompt may involve displaying an indication to perform one or more hand gestures. The wearer may then track their own hand movements with their eye(s) while keeping their head stationary as the sensors capture images of the eye(s) over a given period of time.

In general, the HMD may perform one or more tests in order to determine that the HMD is detecting a live eye or eyes. The HMD may perform these tests while obtaining the eye-scan data (or prior to obtaining, in some examples). One or more sensors of the HMD may be configured to detect eye blinks, changes in pupil size, pupil location, blood flow in eye blood vessels, and eye movements. One test to determine if the HMD is detecting a live eye may include the HMD producing a predetermined pattern of lights from different directions and prompting the wearer to follow each light with their eye or eyes. Other live eye detection tests are also possible.

The HMD may also determine that it is being worn by detecting non-eyeball-related data, such as data representative of a pulse of the wearer detected via one or more sensors/transducers located proximate to the wearer's temples. Other types of WCDs, or computing devices such as smartphones, may be configured to scan a user's/wearer's palm print or record other biometric data. Other embodiments and combinations of embodiments are possible as well.

IV. Example Methods And Scenarios

Figure 3A:
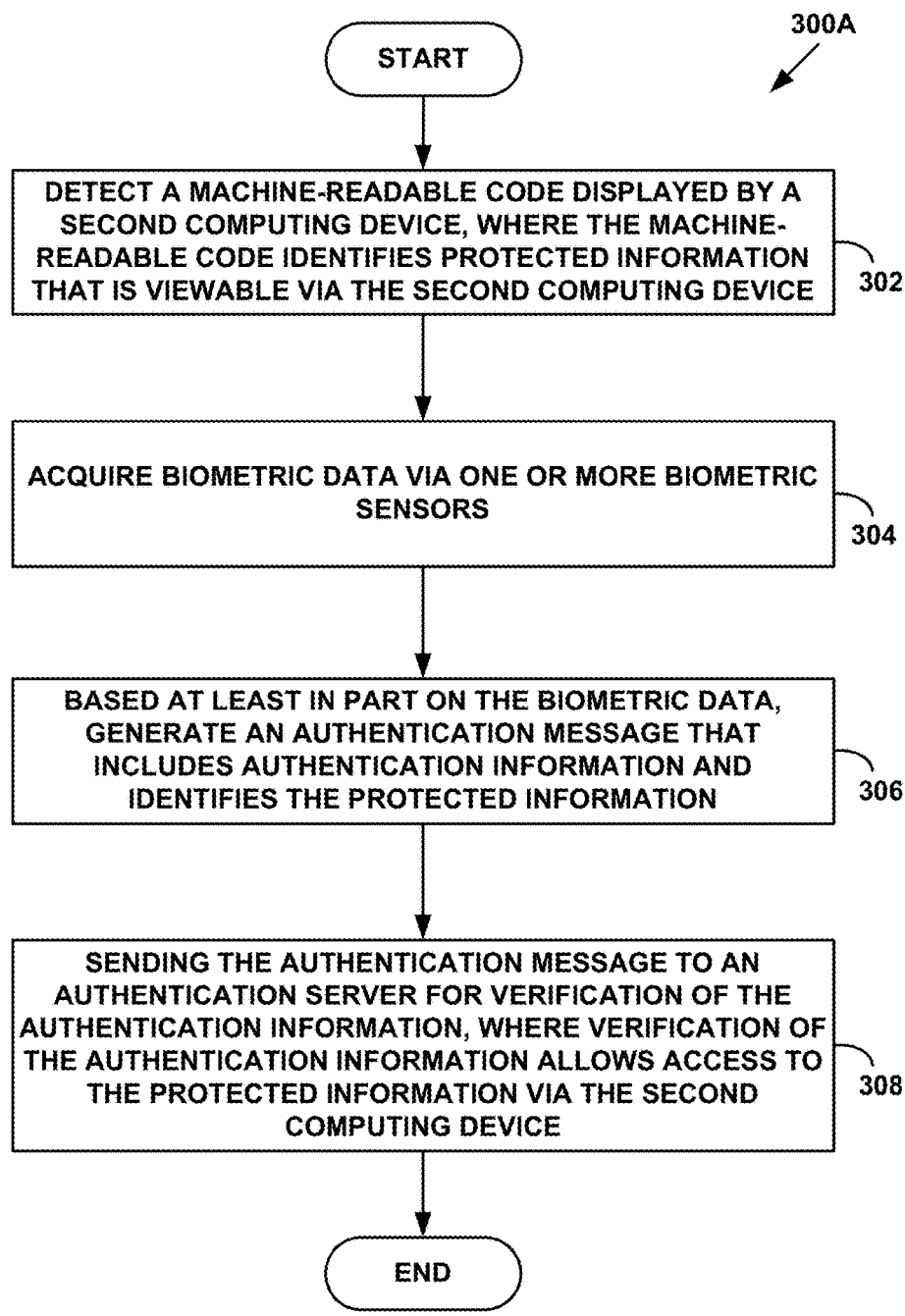
FIGS. 3A and 3B show an example method for detecting machine-readable code identifying protected information, and providing biometric data for authentication in order to access the protected information, according to an example embodiment.
Figure 3B:
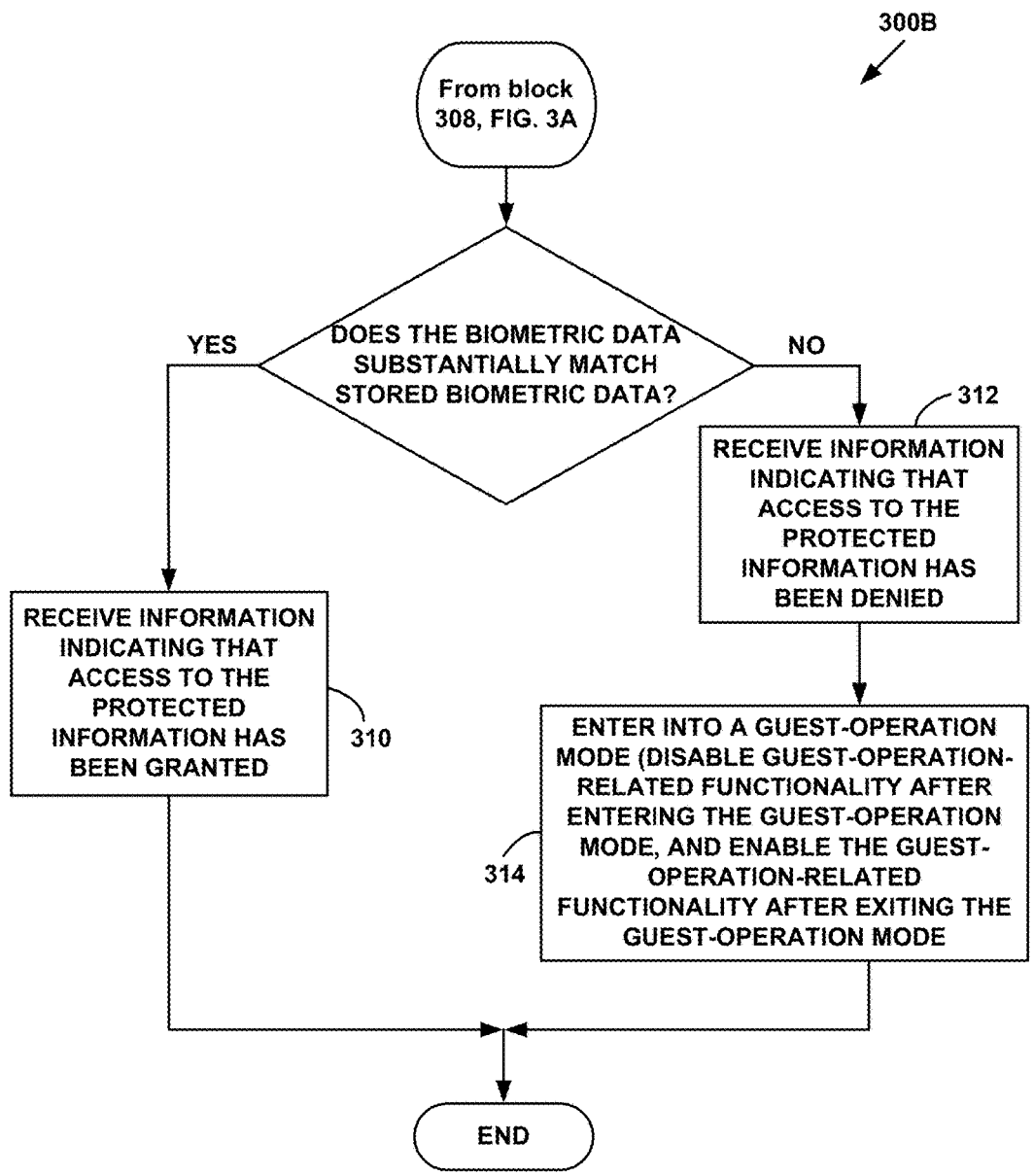

FIGS. 3A and 3B show example methods 300A and 300B, according to example embodiments. In particular, methods 300A and 300B may help a first computing device use a machine-readable code displayed on a second computing device to facilitate secure access to protected information via use of biometric data. The first computing device may be an HMD, as described below; however, the first computing device can also be another computing device, such as a mobile phone, tablet computer, laptop computer, another type of wearable computing device, or the like. The second computing device may also be a mobile phone, tablet computer, laptop computer, desktop computer, another HMD or wearable computing device, or the like.

Referring to FIG. 3A, the method 300A begins at block 302, where the HMD detects the machine-readable code displayed by the second computing device. The machine-readable code identifies protected information that is viewable via the second computing device. The machine-readable code may be included in a first viewable object/interface, such as a first webpage, and the protected information may be included in a second viewable object/interface, such as a second webpage associated with the first webpage, in some embodiments. The terms "first viewable object" and "second viewable object," as well as similar terms, may be used below to describe a manner by which the machine-readable code and the protected information can be viewed/displayed.

In some examples, the first and second viewable objects may be associated with an account, such as an email account, bank account, or user profile account on a computing device. Further, the first viewable object may indicate a type of protected information (e.g., a type of account), and the second viewable object may include the protected information, which may be viewable via the second computing device once the identity of the wearer of the HMD is verified, thereby authorizing the wearer to access the protected information. In general, gaining access to the protected information comprises gaining access to protected data.

After the HMD is presented with the machine-readable code on a display of the second computing device, the HMD may be configured to detect or scan (e.g., take a picture of) the bar code with one or more outward-facing cameras/sensors in order to receive identification of the protected information. In some embodiments, the bar code may be detected in response to a user request (e.g., via an application configured for such a purpose, or a voice command such as "Ok, HMD, log me in."). Alternatively, the HMD may implement a background process to periodically or continuously obtain images of the wearer's environment and detect when a bar code, such as a QR code, is present. For example, the HMD may start continuous/periodic searching for QR codes in response to a given event or state (e.g., detecting that the user is viewing content on their laptop, or possibly the user putting their HMD into a "laptop-companion" mode).

Further, in some embodiments, the machine-readable code may include information associated with the first viewable object that includes the machine-readable code. For example, the machine-readable code may identify the first viewable object. For instance, consider a scenario in which the two viewable objects are webpages. In this scenario, the information associated with the first webpage may include a uniform resource locator (URL) of the first webpage, and/or an internet protocol (IP) address of the first webpage. The information can also include a public key of the first webpage, and a time at which the information associated with the first webpage is received. Further, in some embodiments, the machine-readable code may provide session information related to a user's current session via the associated webpage. The machine-readable code may provide other types of information as well.

In some embodiments, the machine-readable code may be a bar code. In one example, the bar code may be a two-dimensional bar code, such as a quick response (QR) code. If the first viewable object is a first webpage, information associated with the first webpage, such as the URL, IP address, and public key of first webpage, may be encoded in the bar code. A request for the HMD (or other device) to provide authentication information may also be encoded in the bar code. Other information associated with the first webpage, second webpage, or first and second viewable objects/interfaces may be encoded in the bar code as well. Other methods of encoding or otherwise providing the information are also possible.

The bar code (e.g., QR code) may also encode at least one security question associated with the wearer of the HMD and to which the wearer has previously provided a response (e.g., "What is the name of your first pet?"). For example, the HMD may scan the QR code to obtain the security question, and then the wearer can speak or otherwise enter the previously provided response. In some embodiments, some or all information associated with the first viewable object may not be received by the HMD until the wearer provides a correct response to the security question. In other embodiments, the wearer may be prompted to provide the correct response to the security question after the other information has been received, but before any other functions may be performed by the HMD.

The security question may be implemented in addition to other authentication factors in order to access the protected information. In general, it should be understood that accessing the protected information may involve multiple authentication factors, such as multiple types of biometric data, password information, pass-token output, and/or other information. As such, the HMD may detect in the machine-readable code requests to provide such authentication factors.

In some embodiments, the QR code (or other bar code) may be representative of a challenge request for authentication, and the challenge request may indicate that biometric data must be provided in order to access the protected information. For instance, in response to detecting the QR code, the HMD may receive a challenge signal requesting a verification response verifying the authenticity of a wearer of the HMD using the biometric data. In response to receiving the challenge signal, the HMD may transmit an acknowledgement signal. The HMD may then be enabled to receive biometric data from the wearer.

At block 304, the HMD acquires biometric data via one or more biometric sensors. The biometric data can be obtained by one or more of the methods described above. The biometric data may include eye-scan data received from one or more sensors coupled to the HMD. In some embodiments, receiving eye-scan data from the one or more sensors could simply involve the HMD receiving data from an eye-scanner. In other embodiments, receiving eye-scan data could involve requesting eye-scan data, controlling the eye-scanner and causing it to perform the eye scan, and/or other functionality involved in generating and/or acquiring the eye-scan data.

The HMD may use the data captured by the one or more sensors to create, select and/or digitize an image of the eye. Individual images of the eye may be captured by the one or more sensors using a frame grabber during the eye-scan process. In one embodiment, the HMD may analyze the images to identify patterns in an iris, and convert the patterns into a digital template. In another embodiment, the HMD may identify patterns of light and dark image data that correspond the dark pupil and the sclera (e.g., the white of the eye) to create the digital template. In yet another embodiment, the digital template may be a record that is compared against predetermined stored biometric data used for authorization, as discussed below. In still another embodiment, the digital template may include a 1024-byte record (32×32×1 byte grayscale or color). In yet still another embodiment, the eye-scan process may takes a very short amount of time to complete (e.g., approximately one second).

In some embodiments, a digital signature of the eye-scan data (and/or other biometric data) may be generated by the HMD (or other computing device) from the eye-scan data and used for authorization rather than the actual images of the wearer's eye(s), thus providing additional security for the wearer's biometric data. For example, a locality-sensitive hash (LSH) function, such as MinHash, may be used by the HMD to generate the digital signature from the eye-scan data. The digital signature may be unique to the wearer of the HMD, such that unauthorized parties cannot obtain (e.g., reconstruct) the images of the wearer's eye(s) from the digital signature. In such embodiments, when the HMD is initially set up for biometric authorization, initial biometric data of the wearer may be captured by the HMD. The HMD may then generate a digital signature for the initial biometric data, exchange public keys with an authorization server, encrypt the digital signature, and send the encrypted digital signature to the authorization server to be stored. As such, the actual biometric data may not ever need to be stored locally at the HMD or remotely at the authentication server (or other server). If the digital signature or LSH function is ever compromised (e.g., theft), the wearer of the HMD can change the LSH function and set up the HMD again for biometric authorization. The HMD can then capture new initial biometric data and generate a new digital signature.

According to an example embodiment in which the wearer is attempting to access a secured webpage, the HMD can inform the wearer that eye-scan data is being captured for the purpose of seeing a secured webpage. The HMD can also allow the wearer to choose to provide or not to provide the eye-scan data, and if the wearer so desires, provide captured eye-scan data to the second computing device to access the secured webpage.

At block 306, based at least in part on the biometric data, the HMD generates an authentication message that includes authentication information and identifies the protected information. In some embodiments, some or all of the authentication information may be encrypted by the HMD. The HMD may encrypt the authentication information with a private key associated with the HMD. The private key of the HMD may be stored locally at the HMD or remotely on secure, cryptography-based hardware devices, a smart card, or a cloud-based server. The public key of the HMD may be stored locally and/or remotely as well.

The authentication information may comprise encrypted biometric data, such as encrypted eye-scan data, generated by the HMD based on the acquired biometric data. In some embodiments where the biometric data is eye-scan data, the actual eye-scan image (e.g., iris print image) may not be encrypted, but rather at least one copy of the eye-scan image of the same resolution, lower resolution, and/or higher resolution. In some embodiments, the HMD may encode a digital watermark into the biometric data (e.g., the eye-scan image). The digital watermark may include at least a portion of the authentication information described herein.

The authentication information may also comprise at least one identifier associated with the HMD, the authorization session, and/or with the wearer of the HMD. For example, the HMD may encrypt a serial number of the HMD, an IP address of the HMD, a time stamp of the authentication session, a time stamp at which the biometric/eye-scan data was received by the HMD, and/or personal information of the wearer of the HMD. As a further example, the HMD may also encrypt identifiers such as a MAC address of the HMD, a mobile ID number (MIN) of the HMD, a bar code of the HMD, and/or a subscriber identification module (SIM) card ID.

In some embodiments, the public key of the HMD may be provided separately from other encrypted information, and may be stored either locally at the HMD or remotely at another computing device. In some embodiments, public keys can be stored using one or more computing devices associated with a trusted authority configured with software and/or hardware to protect public keys and other sensitive information from unauthorized access.

In particular embodiments, the HMD may control access to its private key using at least a portion of the biometric data of the wearer. For example, an owner of the HMD may provide various biometric data to the HMD, including but not limited to eye-scan data, to access the private key. Thus, unauthorized users of the HMD (or other unauthorized computing devices) may be prevented from accessing the HMD's private key. Other cryptographic methods for encrypting the biometric data are also possible.

At block 308, the HMD sends the authentication message to an authentication server for verification of the authentication information, where verification of the authentication information allows access to the protected information via the second computing device. The authentication server may be one or more computing devices separate from the HMD and the second computing device. In some embodiments, the second computing device may function as the authentication server and verify the authentication information.

In some embodiments, the encrypted authentication information may be provided to the authentication server or other computing device, such as a server providing a first webpage. The authentication server may then process and decrypt the encrypted authentication information to identify the wearer of the HMD. As an example, if the first viewable object is a first webpage, the HMD may provide the encrypted authentication information to the webpage's URL/IP address via WiFi or Bluetooth connectivity.

In some embodiments, verification of the authentication information may include the authentication server (or other computing device, such as the HMD or the second computing device) making a determination of whether the biometric data substantially matches stored biometric data. The authentication server may process the biometric data before comparing it to the stored biometric data. The stored biometric data may be stored either locally at the HMD or remotely at another computing device, such as the second computing device or the authentication server associated with the authorization process described herein.

The authentication server may decrypt the encrypted biometric data and other authentication information using the public key of the HMD. The authentication server may then access the stored biometric data and compare the stored biometric data to the decrypted biometric data. The authentication server may then send to the HMD information indicative of whether there was a match as a result of the comparison. In other embodiments, the HMD or other computing device may perform the comparison. Other embodiments are also possible.

In one embodiment, an enrollment process may be implemented to establish the predetermined stored biometric data, such as stored eye-scan data. The enrollment process may involve a similar, but more detailed scan of the eye as discussed above. One or more sensors may be configured to capture several individual digital still images of a wearer's eye during the enrollment process. The HMD (and/or other computing device) may then analyze the patterns in the eye and convert them into a stored digital template. The stored digital template may be used as stored eye-scan data, which can be matched to a later eye scan to identify the particular wearer of the HMD. In an example embodiment, stored eye-scan data could take the form of a 1024-byte data record. Other formats for stored eye-scan data are possible as well.

Once the biometric data (e.g., eye-scan data) is stored at the authentication server, the authentication server (or other computing device, such as the HMD) may compare the received data and corresponding digital template with the stored data to determine if there is a match. In one embodiment, in order to compare the stored data with the current eye-scan data, the authentication server may calculate the Hamming Distance. The Hamming Distance is a measure of the variation between the stored data and the current eye-scan data and corresponding digital template. In one embodiment, each of the bits of the digital template is compared against each other, (i.e. bit 1 from the current digital template and bit 1 from the stored predetermined authorization data are compared, then bit 2 and so on). Any bits that do not match are assigned a value of one and bits that do match are assigned a value of zero.

Once all the bits have been compared, the number of non-matching bits is divided by the total number of bits to produce a two-digit figure of how the two records differ. In one embodiment, if such a comparison yields a Hamming Distance of 0.342 or greater, then the two records are considered to have come from two different subjects (e.g., users, wearers, etc.) and authorization is denied. If such a comparison yields a Hamming Distance of less than 0.342, then the two records are considered to have come from the same subject and authorization is granted.

As noted above, in some embodiments, the authentication server (and/or other computing devices) may receive encrypted digital signatures that have been generated at the HMD from the biometric data using an LSH function, rather than the actual biometric data. By using an LSH function to generate an initial digital signature for eye-scan data, the same digital signature can then be generated from any image of the wearer's eye(s) that substantially matches the initial image. Further, even though there may be variations of the captured images of the wearer's eye(s) (e.g., lighting and eye position), the LSH function allows for the same digital signature to be generated from each of the various images. In such embodiments, the authentication server may decrypt the encrypted digital signature and compare the encrypted digital signature to other digital signatures generated from previously-obtained eye-scan data of the wearer to determine if the encrypted digital signature matches the other digital signatures. Using such a process, the actual images of the wearer's eye(s) may never need to be stored at the authentication server, unlike processes that utilize calculation of a Hamming Distance. Other embodiments for comparing features of the eye-scan data with the stored eye-scan data are possible as well.

It should be understood that additionally or alternatively to scanning a QR code and matching received biometric data to predetermined stored biometric data in order to gain access to the protected information, other authorization procedures may be required as well, such as palm print matching, voice print matching, security question response matching, and the like.

It should also be understood, that in some embodiments, after comparing the newly received biometric data to the stored biometric data, the HMD may not store the newly received biometric data. Rather, the HMD may re-scan a wearer's eye and/or re-determine biometric data of the wearer each time a challenge request or other such request for authorization is determined based on the HMD detecting the machine-readable code. For instance, the HMD may re-authenticate an iris scan of a wearer each time the HMD is worn in order to verify the wearer's identity. Thus, an unauthorized user of the HMD (e.g., someone attempting to gain access to the HMD owner's accounts) may not use previously determined biometric data of the HMD owner in order to login to the HMD owner's accounts. Further, various security measures may be implemented when a biometric match is not determined. In other embodiments, however, a presence of other security measures may render repeated eye-scanning unnecessary, and only an initial eye-scan may be needed from the owner of the HMD.

Referring to FIG. 3B, method 300B shows additional functions of the HMD that may be involved in method 300A or other similar example methods. If it is determined by the authentication server (or other computing device) that the biometric data substantially matches the stored biometric data, the method 300B continues from block 308 of method 300A at block 310, where the HMD receives information indicating that access to the protected information has been granted. For example, access to the protected information may be represented by the second computing device displaying the second viewable object associated with the first viewable object and including the protected information. Further, the second viewable object may include visual information indicative that access has been granted and that the wearer of the HMD has been successfully authenticated. Upon successful authentication, the HMD may set itself to operate in a mode that allows for a high level of functionality for the wearer.

In one embodiment, after authenticating the wearer (at any point after the user has been authenticated), the HMD can continuously verify the wearer during use. For example, as the wearer's eyes saccade through normal use of the HMD, sections of the wearer's eye scan past the one or more sensors. The HMD may reconstruct those sections of the wearer's eye and compare it with the authenticated wearer. If at some point during use the HMD (and/or other computing devices in communication with the HMD) cannot find a good match for the sections of the wearer's eye, the HMD can begin operating in a locked mode (e.g., a guest-operation mode) and request the user to re-authenticate.

In some embodiments, after the HMD determines that the biometric data substantially matches the stored biometric data, it may responsively determine a password (e.g., a text string) associated with the protected information. For example, in such embodiments, rather than providing immediate access the protected information, the HMD may retrieve the wearer's password and send the password to the second computing device so as to gain access to the protected information (e.g., log the wearer into an account comprising the protected information). The password can be sent to a server (e.g., the authentications server, a web server, etc.) or directly to the second computing device via the Internet or a direct wireless connection such as Bluetooth, near field communication (NFC), radio frequency identification (RFID), a local network, etc. The password may be stored locally at the HMD or may be stored remotely at the authentication server, the second computing device, or other computing device(s). The password can be used by the HMD or second computing device to automatically log the wearer in, or alternatively the password can be provided (e.g., visually or audibly) to the wearer of the HMD so that the wearer can manually enter the password at the second computing device. Other examples are also possible.

If it is determined that the eye-scan data does not match the predetermined authorization data, method 300B continues at block 312 where the HMD receives information indicating that access to the protected information has been denied. Such indicative information may take the form of a text string displayed to the wearer. Such indicative information may also take the form of a non-textual cue, such as an audio notification (e.g., a beep, automated voice message, or other sound) and/or a vibration pattern of the HMD (e.g., via one or more bone conduction transducers). Other examples are also possible.

After the HMD receives information that access to the protected information has been denied, the method 300B continues at block 314 where the HMD enters into a guest-operation mode. After entering into the guest-operation mode, the HMD may be configured to disable guest-operation-related functionality of the HMD. The term "guest-operation-related functionality" may refer to functionality of the HMD that is enabled only for authorized wearers of the HMD (e.g., the owner of the HMD). For example, an authorized wearer may install software applications (e.g., games, email, etc.) on the HMD, while an unauthorized wearer using the HMD in guest-operation mode may be prevented from installing, uninstalling, or otherwise configuring software applications. Limiting guest-operation mode functionality may help to prevent unauthorized users from gaining access to personal information saved on the computing device. Further, if/when the HMD exits the guest-operation mode, the HMD may be configured to enable the guest-operation-related functionality.

When the HMD enters into guest-operation mode, the HMD may display to the unauthorized wearer of the HMD a notification that the HMD is operating in guest-operation mode. For example, the HMD may continuously display "GUEST MODE ACTIVE" until the HMD exits guest-operation mode. As noted above at block 312, the HMD may continuously or sporadically provide other notifications to the unauthorized wearer. In some scenarios, an authorized wearer, such as the owner of the HMD, may provide biometric data that does not match the stored biometric data. After the HMD determines that the biometric data does not match the stored biometric data and enters into guest-operation mode, the HMD may be configured to receive further authentication information (possibly including personal information of the wearer or further biometric data of the wearer) in order for the wearer to assure that they are authorized to access the protected information and exit guest-operation mode.

Once the HMD enters into guest-operation mode, the HMD may also create a guest profile and store guest data for an unauthorized wearer. The guest profile and/or guest data may store information about the guest, such as a time of entering into guest-operation mode, captured images of the guest, indication(s) of application(s) as being allowed or inhibited from use by the guest, indication(s) of data as being allowed or inhibited from access by the guest, and/or other information. The unauthorized wearer may be prevented from creating/storing at least some data in the HMD. In some embodiments, the guest profile and all stored guest data may be deleted when the HMD exits guest-operation mode, such that the HMD does not store any changes made by the unauthorized wearer during guest-operation mode.

The unauthorized wearer may have limited permissions, as noted above. In one embodiment, the unauthorized wearer may be prevented from changing security settings of the HMD. In similar embodiments, an exception may be made for device administrators, and an administrator mode may be enabled based on authentication information provided by a device administrator. Further, biometric data, personal information, or other information associated with a device administrator may be stored at and recognized by the HMD and/or other computing devices, such as a server.

In another embodiment, the unauthorized wearer may be allowed to access a subset of software applications. In such embodiments, access to any non-executable files (e.g., documents) created by the owner of the HMD may not be allowed. Further, access to files may be limited based on permissions of the files, to restrict file access on a per-file basis. In some embodiments, one or more components of the HMD may be disabled for the unauthorized wearer. For example, the unauthorized wearer may have access to all components of the HMD but the camera. In other embodiments, the HMD may inhibit most or all network functionality while operating in guest operation-mode. In still other embodiments, the HMD may execute a particular application in order to distract the unauthorized wearer. In yet still other embodiments, the guest-operation mode may limit the amount of time, memory, and/or battery power available to the unauthorized wearer. For example, while operating in guest-operation mode, the HMD may automatically turn off once the battery power drops below a predetermined threshold. Additionally or alternatively, the unauthorized wearer may be given only a short period of time to use the HMD before the HMD turns off, resets, or displays a prompt for re-authentication.

In some embodiments, the HMD or other computing device may determine that an unauthorized wearer may be attempting to access important protected information, such as secure accounts of the owner of the HMD. In such embodiments, as well as other embodiments, stricter measures may be taken while the HMD is operating in guest-operation mode. For example, the HMD or network may provide a notification to the owner of the HMD (e.g., a call or text message sent to the HMD owner's cell phone) that an unauthorized wearer is attempting to access the HMD owner's accounts. In some scenarios, the notification of the owner may be performed without informing the unauthorized wearer. In similar embodiments, a notification may also (or instead) be sent to law-enforcement authorities or other authorities. Notifications may be sent to the owner of the HMD or third parties if the owner of the HMD or other responsible party so authorizes. Further, the HMD may delay the unauthorized wearer after sending the notification(s) in order to give a third party time to take proper action. For instance, the HMD may execute a random or predetermined application to delay the unauthorized wearer.

In some embodiments, the HMD may be configured to detect a predetermined pattern of eye blinks, or the like, representative of a "panic button." The wearer may blink the predetermined pattern in order to notify authorities that while the wearer may provide matching biometric data for authentication, the wearer may be under duress. Upon detecting the predetermined blinking pattern, the HMD may send a notification to law-enforcement authorities or other third party, indicating that one or more of the wearer's accounts (or the wearer themselves) may be at risk. In other embodiments, authentication sessions may be recorded by a high-resolution camera (e.g., a recorded view of a wearer's eye and a background of the wearer). A video of the authentication session may be sent to a third party automatically when the HMD enters into guest-operation mode. The video may also be sent when the wearer blinks the predetermined pattern of eye blinks to indicate that they are under duress (e.g., blinks in patterns recognizable as Morse code). As noted above, the video and/or other notifications may be sent to the owner of the HMD or other responsible party for the HMD if the owner or responsible party so authorizes.

It should be understood that other guest-operation mode permissions/settings are also possible, and that any combination of the aforementioned permissions (and other permissions not described herein) is possible as well. It should also be understood that one or more of the security measures/embodiments described herein may be applied to scenarios in which an authorized wearer is under duress, and the embodiments should not be limited to scenarios in which an unauthorized wearer is attempting authentication.

Figure 4:
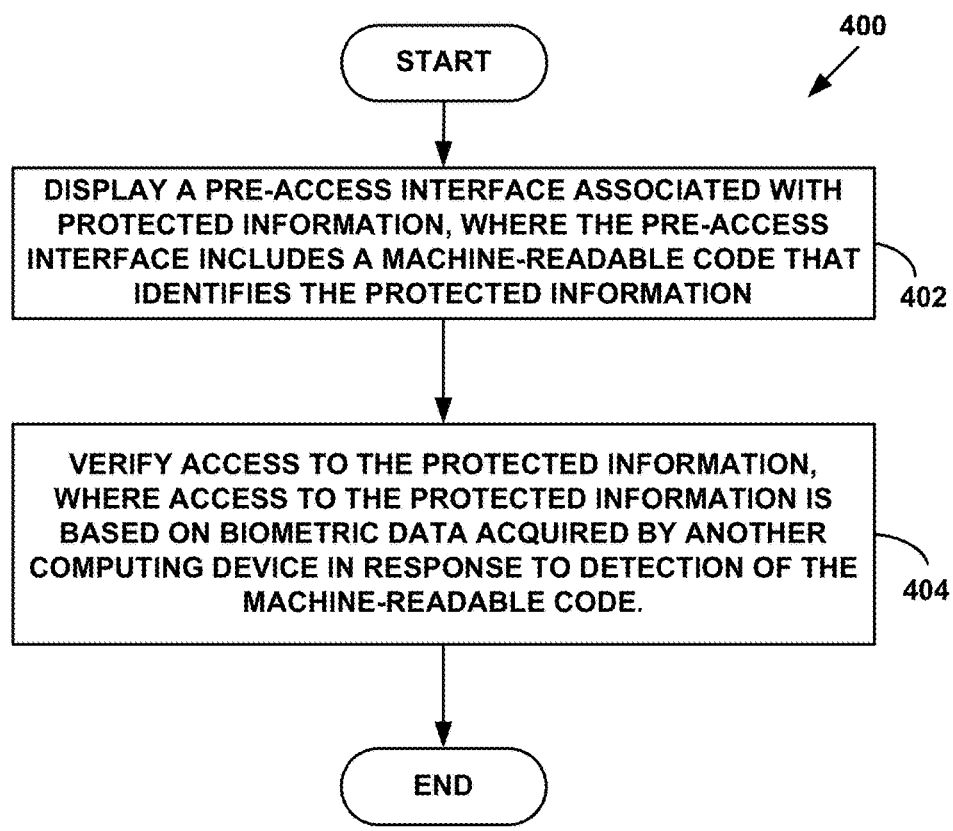
FIG. 4 shows an example method for displaying a pre-access interface including the machine-readable code, and displaying a post-access interface including the protected information based on authentication of biometric data, according to an example embodiment.

FIG. 4 shows an example method 400 for the second computing device (as described above) displaying a pre-access interface including the machine-readable code, and displaying a post-access interface including the protected information based on authentication of biometric data, according to an example embodiment. In some embodiments, some or all of the functions performed by the second computing device may be performed by the HMD, the authentication server, or other computing device(s).

At block 402, the second computing device displays the pre-access interface associated with the protected information, where the pre-access interface includes the machine-readable code that identifies the protected information. For example, the pre-access interface may be the first viewable object as described above, such as a first webpage.

At block 404, the second computing device verifies access to the protected information, where access to the protected information is based on biometric data acquired by another computing device in response to detection of the machine-readable code. By verifying access to the protected information, the second computing device may receive an access-verification message from an authentication server, and the access-verification message may indicate verification of authentication information acquired by the other computing device, the authentication information including the biometric data. The authentication server may be configured to actively determine access for the other computing device.

Responsive to receiving the access-verification message, the second computing device may send to the other computing device information indicating that access to the protected information has been granted and displaying the post-access interface including the protected information. As noted above, the information indicating that access to the protected information may take the form of visual or audio information, and the post-access interface may include a second viewable object (e.g., a second webpage associated with the first webpage).

It should be noted that the "other computing device" may be the HMD (e.g., the first computing device), the authentication server, or combination of computing devices. Other examples are also possible.

FIGS. 5A-5F illustrate an example scenario of a computing device authenticating biometric data in order to access a viewable object, according to an example embodiment. In the example scenario, the computing device takes the form of an HMD. It should be understood, however, that the computing device may take the form of other computing devices, both wearable and non-wearable. The viewable object(s) illustrated in FIGS. 5A-5F may be provided by the "second computing device," as described above, where the second computing device may be a laptop computer, tablet computer, smartphone, or the like.

Figure 5A:
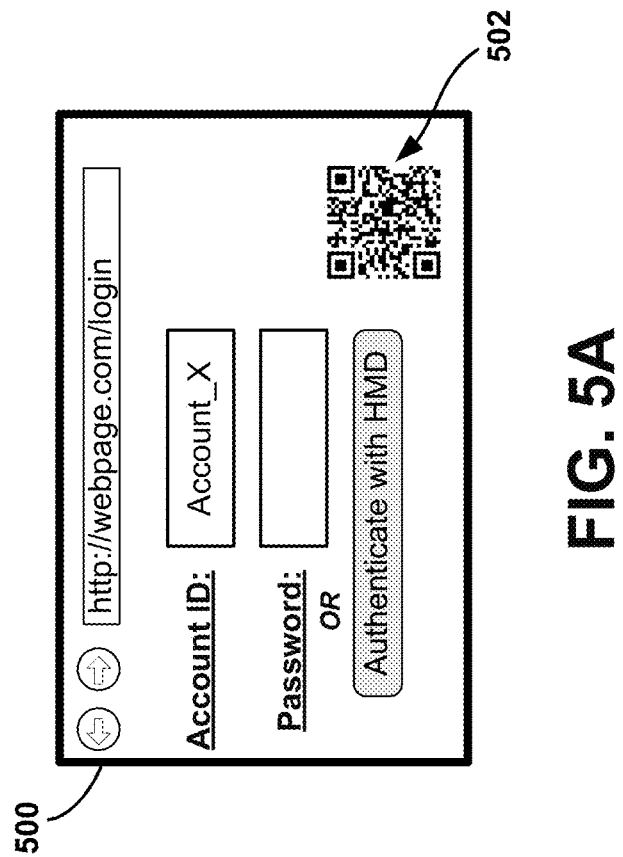
FIGS. 5A-5F illustrate an example scenario of a computing device authenticating biometric data in order to access protected information, according to an example embodiment.

As shown in FIG. 5A, the second computing device may provide a first viewable object, such as a first webpage 500 on a graphical display of the second computing device. In some scenarios, the graphical display may be an interactive graphical display configured to enable the wearer of the HMD to interact with the first webpage 500. For example, the HMD may include one or more devices configured to interpret the wearer's eye movement as user input commands to interact with the first webpage 500. In particular, the HMD may include one or more inward-facing image capture devices and/or one or more other inward-facing sensors that may be used to track eye movements, determine the direction of the wearer's gaze, and/or capture an image of the wearer's eye. As such, certain eye movements or scanned images of the wearer's eye may be mapped to certain actions. Still further, the HMD may include outward-facing sensors or capture devices, such as a camera, which may be used to detect/capture information in front of the user, such as the machine-readable code as described above.

In the scenario of FIG. 5A, and in accordance with the example method 300A-B of FIGS. 3A-B, the HMD may detect the machine-readable code displayed by the second computing device. As shown, the wearer may select "Authenticate with HMD," which may cause a QR code 502 to be generated/displayed on the first webpage 500. In some examples, as noted above, the QR code 502 may identify protected information and include information associated with the first webpage 500, such as a uniform resource locator (URL) of the first webpage 500, an internet protocol (IP) address of the first webpage 500, a public key of the first webpage 500, and a time at which the authentication information associated with the first webpage 500 is received. The HMD may be configured to scan the QR code 502 with an inward-facing (or outward-facing) camera/sensor and process the information included in the QR code 502.

Figure 5B:
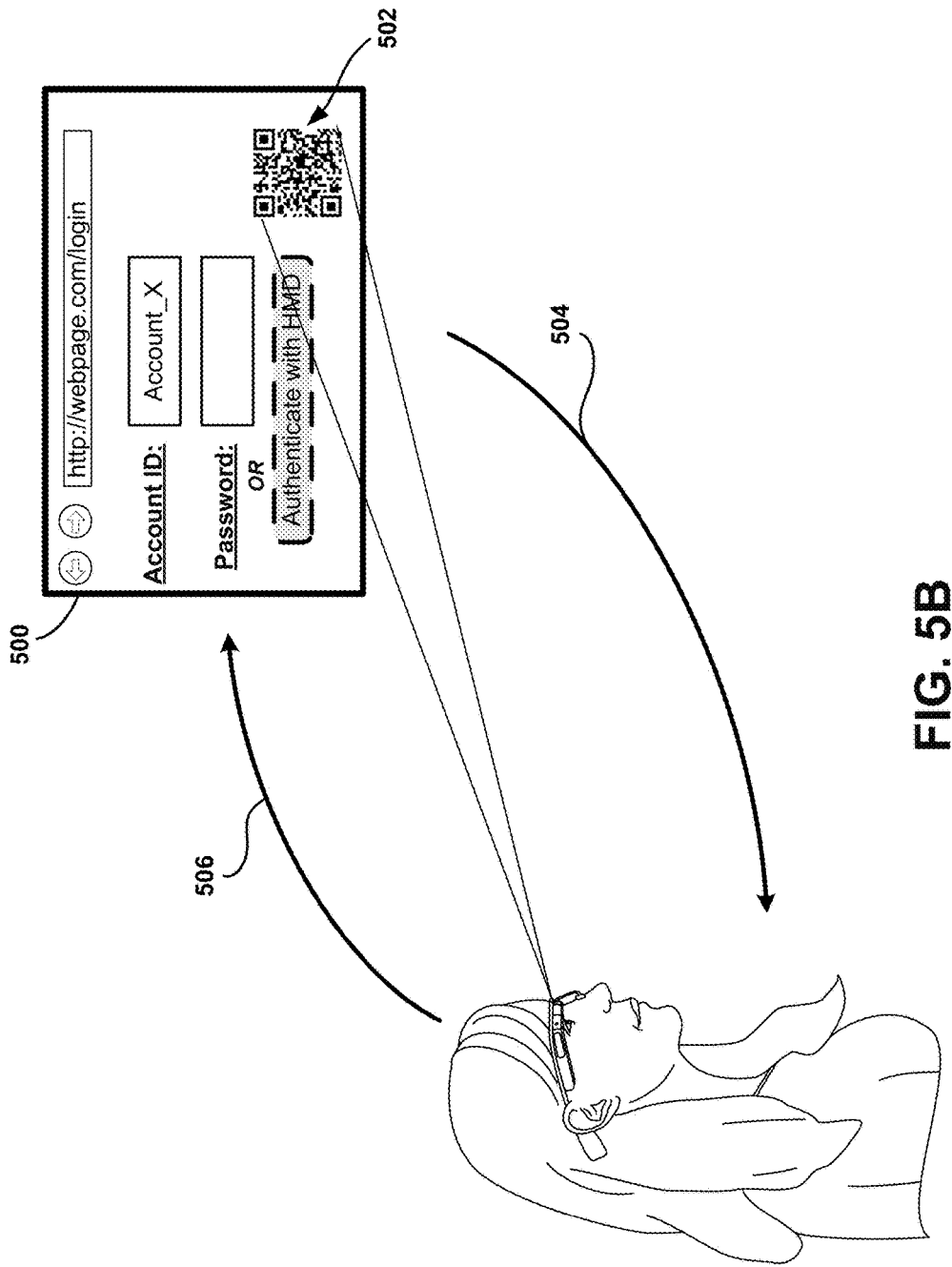

FIG. 5B illustrates an example scenario involving an interaction between the HMD and the second computing device (and/or an authentication server, as described above). FIG. 5B illustrates information 504 received at the HMD from the first webpage 500 and information 506 sent by the HMD to the second computing device (or the authentication server). Received information 504 may include information associated with the first webpage 500 and a request for the HMD to provide information so as to access the protected information (e.g., a second webpage). Sent information 506 may include encrypted data, information/identifiers associated with the HMD, personal information associated with the wearer of the HMD, and an authentication message which may include all the aforementioned information. Other types of received/sent information are also possible.

By scanning the QR code, the HMD may determine that the authentication information includes the request to provide biometric data. In response, the HMD may acquire biometric data of the wearer, such as an eye-scan facilitated by a sensor associated with the HMD, for example. After receiving the biometric data, the HMD may encrypt the biometric data, perhaps along with other information, such as a name of the wearer, an IP address of the HMD, an identifier of the HMD, etc. The HMD may further include the encrypted biometric data and the other information in the authentication message.

The authentication information can have multiple authentication factors, such as multiple types of biometric data, password information, pass-token output, and/or other information. Encryption can be performed using a private key stored at the HMD. Access to the private key can be controlled using part or all of the biometric data provided in the authentication information. The private key may be stored remotely on secure, cryptography-based hardware devices. Additionally or alternatively, the private key of the HMD (and public key of the HMD) can be stored locally at the HMD, on a smart card, or a cloud-based server.

The access request and encrypted biometric data of the authentication information may then be decrypted by the authentication server, other administrative server, second computing device, or other computing device (not shown). For instance, the authentication server may decrypt the encrypted biometric data with a public key of the HMD. Other examples and methods of encryption and decryption are possible as well. The authentication server may then compare biometric data it received from the HMD with previously stored biometric data of the wearer so as to determine if there is a match. The previously stored biometric data of the wearer may be stored locally at the HMD and/or remotely at the authentication server, among other possibilities. For example, the owner of the HMD may have previously stored one or more images resulting from a scan of the wearer's iris, and that previously stored image(s) may be compared with a iris scan image(s) of the wearer in the authentication information so as to verify the identity of the wearer. The image(s) can be provided as one or more still images or a video of the wearer's iris.

Figure 5C:
Figure 5D:
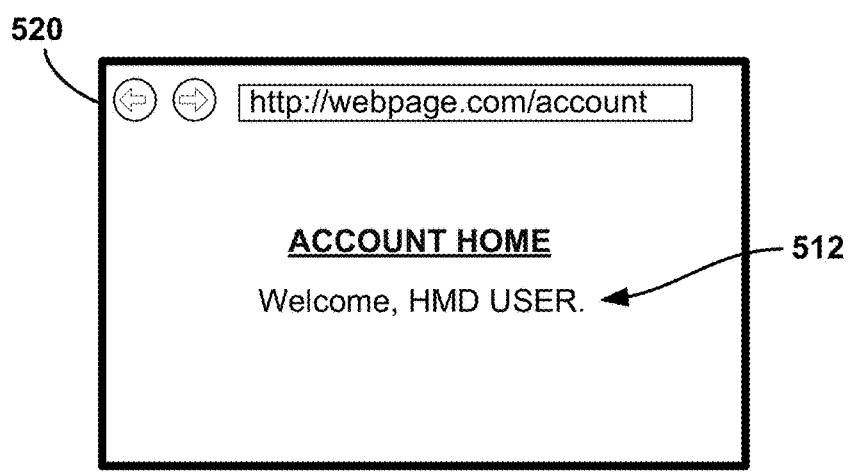

In the case that the biometric data matches the previously stored biometric data, such as the case illustrated in FIG. 5C, the wearer of the HMD may be presented with the second webpage 510 by the second computing device, thus allowing access to the protected information. The second webpage 510 may include a visual indication 512 that authentication was successful and that access to a web-based account was granted. Other types of accounts are also possible, such as personal accounts (e.g., email), deposit accounts, transactional accounts, and the like, which may also be web-based accounts. Additionally or alternatively to the second webpage 510 of FIG. 5C, another webpage 520 may be presented to the wearer and the other webpage 520 may include a visual indication 512 that an authorized wearer is currently accessing the account, such as the "Welcome, HMD USER" message, as shown in FIG. 5D.

Figure 5E:
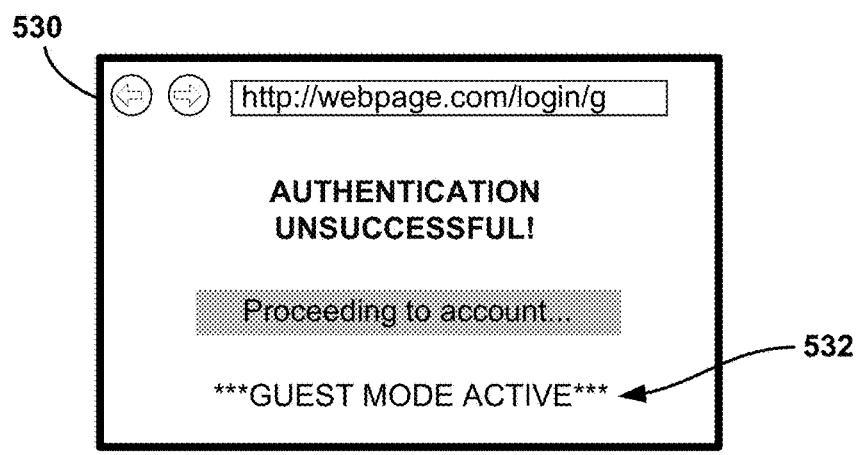
Figure 5F:
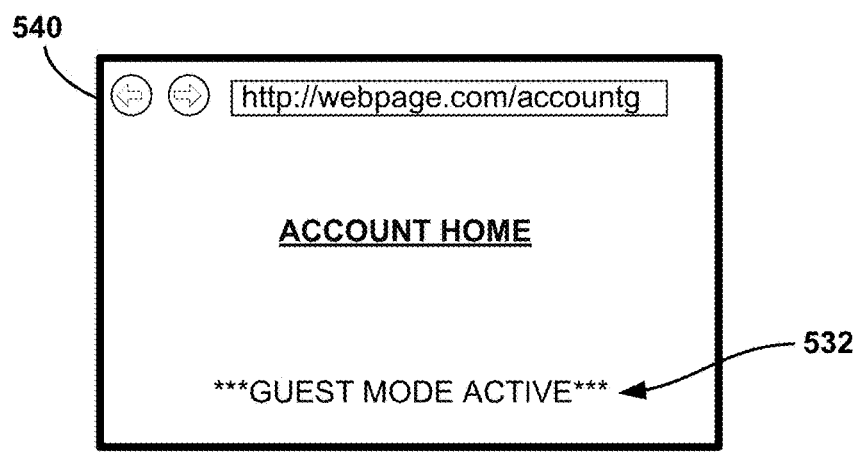

In the case that the biometric data does not match the previously stored biometric data, such as the case illustrated in FIG. 5E, the wearer of the HMD may be presented with a webpage 530 by the second computing device indicating that access to the protected information has been denied. Further, as noted above, the HMD may set itself to operating in a guest-operation mode, which may limit the HMD's functionality. As such, the webpage 530 may include an indication 532 that the HMD is operating in guest-operation mode, such as the "GUEST MODE ACTIVE" notification. Additionally or alternatively to the webpage 530 of FIG. 5E, yet another webpage 540 may be presented to the wearer which may also include a visual indication 532 that the current wearer is unauthorized, as shown in FIG. 5F. This webpage 540 may provide limited access to an account of the HMD owner or may restrict all access. Other examples are also possible.

The methods described above can be implemented in web-based payment scenarios as well. For instance, a website may present the wearer with a QR code after the wearer has selected a payment to be made. The QR code may include a request for the wearer to provide biometric data to authorize the payment and/or other security measures, such as one or more security questions.

In one embodiment, the methods/functions described above can be performed by a mobile phone. For instance, the mobile phone may include one or more cameras configured to detect a machine-readable code displayed by a second computing device (e.g., a laptop computer). Further the one or more cameras may be configured to capture biometric data, such as an image of an eye or eyes. The mobile phone can then send the biometric data and other authentication information (e.g., information associated with the mobile phone) to an authentication server for verification of the authentication information. If access to the protected information is granted, for example, the protected information may then be viewable on the second computing device and/or on the mobile phone itself.

In some embodiments, methods described herein or similar methods may be applied to other devices in accordance with the HMD (or other WCD), such as laptop computers or consumer electronics (e.g. a television) if the device had an accessible IP address, in order access accounts on the device(s) or lock/unlock the device(s). If such a device does not have an accessible IP address, the HMD the device(s) could use infrared transmission protocol like IRDA to communicate. In similar embodiments, similar methods can be used for authentication for physical security systems, such as secure doors at an airport or bank. In such embodiments, an authentication challenge request may occur over IR transmission, Bluetooth, RFID, or other wireless and/or visual mechanism additionally or alternatively to the use of a QR code.

In other embodiments, multiple devices, including a WCD, can be used to implement the method. The HMD and other device(s), such as a smartphone, may be enabled with secure NFC. In an example scenario, a QR code or other representation of a challenge signal may be sent to the smartphone and the smartphone can then be tapped to the WCD over secure NFC to further send the challenge signal to the WCD. The WCD can then provide any necessary authentication information (e.g., biometric data) to the smartphone via NFC.

In some examples, the first and second computing devices may be the same computing device, such as the HMD, where the HMD may be arranged to detect the machine-readable code displayed on its own head-mounted display. In other examples, identification of the webpage (or other viewable object) by the HMD may be transparent to the user, as information included in the machine-readable code may become instantly accessible by the HMD once the webpage is visited, and thus there may be no need to display the machine-readable code. Other examples are also possible.

V. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:

determining, by a first computing device, that the first computing device is being worn;

while the first computing device is determined to be worn, detecting, by the first computing device, a machine-readable code that is displayed by a second computing device, wherein the machine-readable code identifies protected information that is viewable via the second computing device; and responsive to detecting the machine-readable code while the first computing device is determined to be worn:

causing one or more biometric sensors associated with the first computing device to perform actions to collect, at the first computing device, biometric data after the first computing device detects the machine-readable code, based at least in part on the biometric data, the first computing device generating an authentication message that includes authentication information and identifies the protected information, sending the authentication message to an authentication server for verification of the authentication information, wherein verification of the authentication information allows access to the protected information via the second computing device, and after sending the authentication message to the authentication server for the verification of the authentication information, deleting the collected biometric data.

2. The method of claim 1, wherein verification of the authentication information includes a determination of whether the biometric data substantially matches stored biometric data, the method further comprising:
responsive to the determination being that the biometric data substantially matches the stored biometric data, the first computing device receiving information indicating that access to the protected information via the second computing device has been granted.

3. The method of claim 1, wherein verification of the authentication information includes a determination of whether the biometric data substantially matches stored biometric data, the method further comprising:
responsive to the determination being that the biometric data does not substantially match the stored biometric data, the first computing device:
receiving information indicating that access to the protected information has been denied, and
entering into a guest-operation mode, wherein the first computing device is configured to disable guest-operation-related functionality of the first computing device after entering the guest-operation mode, and wherein the first computing device is configured to enable the guest-operation-related functionality after exiting the guest-operation mode.

4. The method of claim 1, wherein the authentication information comprises encrypted biometric data generated by the first computing device based on the collected biometric data, wherein generating the encrypted biometric data comprises encoding additional data into the biometric data, wherein the additional data includes at least one identifier associated with the first computing device and a public key associated with the first computing device.

5. The method of claim 4, wherein the at least one identifier associated with the first computing device includes at least one of a serial number and a computer networking address.

6. The method of claim 4, wherein generating the encrypted biometric data further comprises encrypting the biometric data based at least in part on a private key associated with the first computing device.

7. The method of claim 1, wherein the biometric data includes eye-scan data corresponding to at least one eye.

8. The method of claim 1, wherein at least one of the machine-readable code and the protected information is displayed on a webpage.

9. The method of claim 1, wherein the machine-readable code comprises a bar code.

10. The method of claim 9, wherein the bar code comprises a two-dimensional bar code.

11. The method of claim 1, wherein the stored biometric data is stored locally at the first computing device.

12. The method of claim 1, wherein the stored biometric data is stored remotely at one or more of the authentication server and the second computing device.

13. The method of claim 1, wherein the first computing device is a head-mountable device (HMD), wherein the HMD includes an eyeglass frame configuration.

14. The method of claim 1, wherein generating the authentication message that includes the authentication information based at least in part on the biometric data comprises:
based at least in part on the collected biometric data, determining, by the first computing device, a digital signature for the collected biometric data using a locally-sensitive hash (LSH) function, wherein the digital signature is different from the biometric data;
based on the unique digital signature, generating, by the first computing device, an encryption of the digital signature, wherein the authentication information comprises the encryption of the digital signature; and
generating the authentication message that includes the authentication information.

15. The method of claim 1, wherein determining that the first computing device is being worn comprises determining that the first computing device is being worn on a head of a wearer.

16. The method of claim 15, wherein determining that the first computing device is being worn on the head of the wearer comprises causing one or more sensors associated with the first computing device to detect a pulse of the wearer.

17. The method of claim 15, wherein determining that the first computing device is being worn on the head of the wearer comprises causing one or more sensors associated with the first computing device to perform actions to detect a live eye of the wearer.

18. A first computing device, comprising:
at least one processor; and
a non-transitory computer-readable storage medium having stored thereon program instructions that, upon execution by the at least one processor, cause the first computing device to perform functions comprising:
determining that the first computing device is being worn;
while the first computing device is determined to be worn, detecting a machine-readable code that is displayed by a second computing device, wherein the machine-readable code identifies protected information that is viewable via the second computing device; and
responsive to detecting the machine-readable code while the first computing device is determined to be worn:
causing one or more biometric sensors associated with the first computing device to perform actions to collect biometric data after the first computing device detects the machine-readable code,
based at least in part on the biometric data, generating an authentication message that includes authentication information and identifies the protected information,
sending the authentication message to an authentication server for verification of the authentication information, wherein verification of the authentication information allows access to the protected information via the second computing device, and
after sending the authentication message to the authentication server for the verification of the authentication information, deleting the collected biometric data.

19. The first computing device of claim 18, wherein verification of the authentication information includes a determination of whether the biometric data substantially matches stored biometric data, the functions further comprising:
responsive to the determination being that the biometric data substantially matches the stored biometric data, the first computing device receiving information indicating that access to the protected information via the second computing device has been granted.

20. The first computing device of claim 18, wherein the machine-readable code is detected by at least one first sensor associated with the first computing device, and wherein the first computing device causes at least one second sensor associated with the first computing device to perform the actions to collect the biometric data after the at least one first sensor detects the machine-readable code.

21. The first computing device of claim 20, wherein the at least one first sensor and the at least one second sensor each includes one or more of: an infrared proximity sensor, an infrared photodiode, and a camera.

22. The first computing device of claim 18, wherein the machine-readable code is displayed on a first webpage by the second computing device and the protected information is displayed on a second webpage by the second computing device.

23. The first computing device of claim 22, wherein the machine-readable code includes encoded information associated with the first webpage including one or more of: a uniform resource locator (URL) of the first webpage, an internet protocol (IP) address of the first webpage, a public key of the first webpage, and a time at which the information associated with the first webpage is received.

24. The first computing device of claim 18, wherein verification of the authentication information includes a determination of whether the biometric data substantially matches stored biometric data, the functions further comprising:
   determining that the biometric data substantially matches the stored biometric data; and
   responsively determining a password associated with the protected information, wherein the password is configured to allow access to the protected information.

25. The first computing device of claim 18, wherein the functions further comprise:
   after determining that the first computing device is being worn, after detecting the machine-readable code, and before collecting the biometric data:
      the first computing device receiving a challenge signal requesting a verification response verifying the authenticity of a wearer of the first computing device using the biometric data;
      responsive to receiving the challenge signal, transmitting an acknowledgement signal; and
      after transmitting the acknowledgement signal, the first computing device enabling the one or more biometric sensors to perform the actions to collect the biometric data.

26. The first computing device of claim 18, wherein the authentication information includes at least one identifier associated with the first computing device, wherein the at least one identifier includes one or more of a serial number of the first computing device, a public key of the first computing device, and an IP address of the first computing device.

27. The first computing device of claim 18, wherein the biometric data includes eye-scan data corresponding to at least one eye of a user operating the first computing device, and wherein the actions to collect the biometric data after the first computing device detects the machine-readable code comprise scanning the at least one eye of the user so as to capture the eye-scan data.

* * * * *